US010565004B2

(12) United States Patent
Tourrilhes et al.

(10) Patent No.: US 10,565,004 B2
(45) Date of Patent: Feb. 18, 2020

(54) INTERRUPT AND MESSAGE GENERATION INDEPENDENT OF STATUS REGISTER CONTENT

(71) Applicant: Hewlett Packard Enterprise Development LP, Houston, TX (US)

(72) Inventors: Jean Tourrilhes, Palo Alto, CA (US); Mike Schlansker, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/075,063

(22) PCT Filed: Feb. 4, 2016

(86) PCT No.: PCT/US2016/016534
§ 371 (c)(1),
(2) Date: Aug. 2, 2018

(87) PCT Pub. No.: WO2017/135950
PCT Pub. Date: Aug. 10, 2017

(65) Prior Publication Data
US 2019/0050253 A1 Feb. 14, 2019

(51) Int. Cl.
*G06F 13/24* (2006.01)
*G06F 9/48* (2006.01)
*G06F 9/54* (2006.01)

(52) U.S. Cl.
CPC ............ *G06F 9/4812* (2013.01); *G06F 9/544* (2013.01); *G06F 9/546* (2013.01); *G06F 13/24* (2013.01)

(58) Field of Classification Search
CPC combination set(s) only.
See application file for complete search history.

(56) References Cited

U.S. PATENT DOCUMENTS

| 4,935,894 | A | * | 6/1990 | Ternes | ................ G06F 13/4027 710/310 |
| 5,123,094 | A | * | 6/1992 | MacDougall | ........... G06F 9/544 709/215 |
| 5,379,428 | A | * | 1/1995 | Belo | ....................... G06F 8/451 711/173 |

(Continued)

OTHER PUBLICATIONS

Anonymous: "Programmable interrupt controller—Wikipedia", Jan. 15, 2015. pp. 1-2. XP055470041. Retrieved from the Internet: URL:https://en.wikipedia.org/w/index.php?title=Programmable_interrupt_controller&oldid=642624580 [retrieved on Apr. 24, 2018].

(Continued)

*Primary Examiner* — Raymond N Phan
(74) *Attorney, Agent, or Firm* — Mannava & Kang, P.C.

(57) ABSTRACT

In an example, memory register interrupt based signaling and messaging may include receiving, at a control register of a receiver, a signal number from a sender, and copying, by a memory register interrupt management device of the receiver, the signal number to an associated status register of the receiver. Further, memory register interrupt based signaling and messaging may include generating, independently of the signal number from the status register, an interrupt to a central processing unit of the receiver, and triggering, based on the interrupt, an interrupt handler of the receiver to perform an action associated with the signal number.

15 Claims, 4 Drawing Sheets

(56) References Cited

U.S. PATENT DOCUMENTS

| | | | |
|---|---|---|---|
| 5,689,713 A * | 11/1997 | Normoyle | G06F 9/546 |
| | | | 710/260 |
| 5,701,414 A | 12/1997 | Cheng et al. | |
| 6,105,071 A | 8/2000 | Desnoyers et al. | |
| 6,148,361 A * | 11/2000 | Carpenter | G06F 9/4812 |
| | | | 710/260 |
| 6,170,025 B1 | 1/2001 | Drottar et al. | |
| 6,205,508 B1 | 3/2001 | Bailey et al. | |
| 6,247,091 B1 | 6/2001 | Lovett | |
| 6,295,573 B1 * | 9/2001 | Bailey | G06F 13/24 |
| | | | 710/260 |
| 6,460,105 B1 * | 10/2002 | Jones | G06F 13/24 |
| | | | 710/260 |
| 6,647,431 B1 * | 11/2003 | Utas | G06F 9/4812 |
| | | | 719/313 |
| 6,799,317 B1 * | 9/2004 | Heywood | G06F 9/4812 |
| | | | 710/260 |
| 8,838,864 B2 | 9/2014 | Li et al. | |
| 8,984,199 B2 | 3/2015 | Hammarlund et al. | |
| 2002/0004886 A1 * | 1/2002 | Hagersten | G06F 11/0712 |
| | | | 711/141 |
| 2002/0174165 A1 | 11/2002 | Kawaguchi | |
| 2005/0027914 A1 | 2/2005 | Hammalund et al. | |
| 2006/0047877 A1 | 3/2006 | Winkler et al. | |
| 2013/0290984 A1 | 10/2013 | Denio et al. | |

OTHER PUBLICATIONS

International Search Report and Written Opinion, International Application No. PCT/US2016/016534, dated Oct. 27, 2016, pp. 1-12.

* cited by examiner

INTERRUPT AND MESSAGE GENERATION INDEPENDENT OF STATUS REGISTER CONTENT

BACKGROUND

Messaging may allow entities to exchange information. A message may be described as a piece of data from a sender to a receiver. An example of a message may include an e-mail. The receiver may define a queue, where incoming messages may be queued. When the sender sends a message to the receiver, the sender may transmit the message over a medium, and the message may be queued in the receiver's queue. The receiver may examine the queue, and retrieve the message from the queue. In this regard, signaling may be used to inform, for example, via a notification, the receiver that a message is waiting in the queue.

BRIEF DESCRIPTION OF DRAWINGS

Features of the present disclosure are illustrated by way of example and not limited in the following figure(s), in which like numerals indicate like elements, in which.

DETAILED DESCRIPTION

Figure 1:
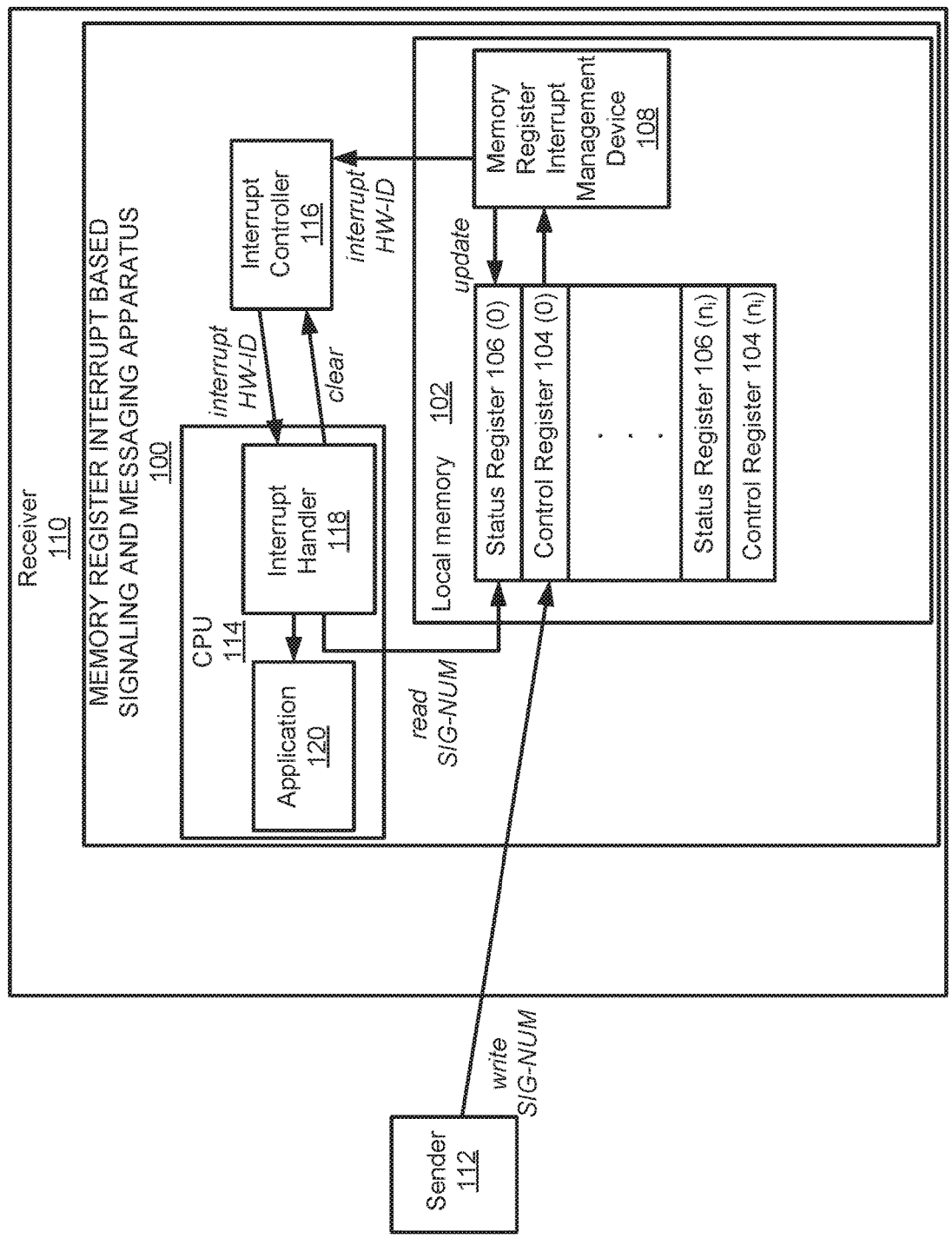
FIG. 1 illustrates a memory register interrupt based signaling and messaging apparatus, according to an example of the present disclosure.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

With respect to messaging, an interrupt may be described as a facility that provides for an input/output (I/O) device or peripheral to send a signal to a central processing unit (CPU). An I/O bus, such as peripheral component interconnect (PCIe), may define the interrupt facility, and carry a number of separate interrupt vector numbers identifying the source of the interrupt. Each I/O device that needs signaling may be assigned an interrupt vector number. A device driver for the I/O device may attach an interrupt handler to the interrupt vector number the device driver is assigned to, where the interrupt handler is a set of machine readable instructions in the operating system (OS) kernel that handles a signal and responds to the signal. When the I/O device needs servicing by the CPU, the I/O device may send the interrupt on an I/O bus to the CPU, the CPU may stop a process that is being executed by the CPU, and the CPU may execute the associated interrupt handler.

The vector number for an interrupt may identify the source of the interrupt. Interrupts may include message-signaled interrupts, where an interrupt is carried as a command on a bus including the interrupt vector number. Upon the reception of an interrupt, an interrupt handler may process multiple events associated with the interrupt. For example, if the interrupt is associated with a queue, the interrupt handler may remove multiple items in the associated queue. Interrupts may include hardware interrupts that are generated by devices outside a CPU, and traps (or "machine readable instructions based interrupts") that are generated by machine readable instructions on a CPU.

In a computer system, messaging may be implemented as machine readable instructions, for example, via CPU instructions. In memory messaging, enqueue and dequeue operations may be implemented using memory write and read operations. In multi-processor systems, messaging may rely on the underlying memory and cache coherency to maintain consistency of a message queue across processors.

With respect to signaling for memory messaging, polling the receive queue may introduce technical challenges related to either CPU overhead when performed at a high rate, or relatively high latency of message delivery if polling is performed at a low rate. Further, signaling for memory messaging may generally not use hardware interrupts or traps, as doing do may introduce technical challenges related to flexibility based on a limited number of signals, and performance based on the added complexity.

In order to address the aforementioned technical challenges with respect to implementation of signaling and messaging, a memory register interrupt based signaling and messaging apparatus and a method for memory register interrupt based signaling and messaging are disclosed herein.

The apparatus and method disclosed herein may be applied to a variety of environments, such as computer systems, or a system comprised of a plurality of nodes (hereinafter denoted "node-based system"). In this regard, examples of the apparatus and method are disclosed herein with respect to a node-based system, but may also be applicable to computer systems, and other such systems generally.

For a node-based system, as disclosed herein, each node may operate as a computer, and each node may include its own operating system and a local memory domain that is coherent with all of the processor cores. Each node may include its own power supply and its own fault domain, such that if one node fails or is shutdown, that node will not directly affect other nodes. Further, each node may include its own separate kernel, where signaling and messaging may not use common queues in the kernel, but instead, signaling and messaging may be performed directly between nodes.

For the node-based system, as disclosed herein, the nodes may be connected using a high speed memory fabric. Examples of the high speed memory fabric may include a next generation memory interconnect (NGMI) developed for the node-based system, or other such memory fabrics. The memory fabric may connect different processors to a large pool of global memory. The memory fabric may support memory operations on the global memory. The memory fabric interface may connect a node to the rest of the fabric and other nodes, and in the case of NGMI, the memory fabric interface may be denoted a Z-BRIDGE.

For the node-based system, as disclosed herein, the apparatus and method disclosed herein may provide a set of memory interrupt constructs for the implementation of signaling and messaging. In this regard, for the apparatus and method disclosed herein, the signaling and messaging may be implemented using memory registers. For the node-based system, the set of memory interrupt constructs may provide for one node to send an interrupt to another node. In this regard, such cross-node interrupts may be used for a variety of signaling purposes.

For the apparatus and method disclosed herein, the memory register interrupt may be triggered by a remote node writing a specific memory register in I/O space, which results in the delivery of an interrupt to a local CPU. The apparatus and method disclosed herein may utilize fabric commands and a set of memory I/O registers in the receiver node memory space. When a memory location is written, an interrupt is generated to one of the local CPUs of the receiver node.

For the apparatus and method disclosed herein, a memory register interrupt management device may be described as a virtual I/O device. The memory register interrupt management device may manage the memory register interrupt, and is mapped into the local memory of the receiver node. The memory register interrupt management device may send interrupts over an I/O bus to an interrupt controller of the receiver node. The memory register interrupt management device may be a multi-function I/O device, and may map to multiple hardware interrupt vectors. Each hardware interrupt vector may be represented by a pair of registers (i.e., status and control, as disclosed herein) in memory at specific locations for the receiver node. The registers may be memory mapped into the local memory space of the receiver node, for example, in I/O space, and are exposed over the memory fabric to allow remote access by other nodes. The remote nodes may write to the control registers of the receiver node via the memory fabric.

For the apparatus and method disclosed herein, each pair of registers may be composed of a control register and a status register, and the registers may be configured with a hardware interrupt vector. The control register may be used by the various senders, and the status register may be used by the receiver node. When writing to the control register, the memory register interrupt management device may update the status register and generate an interrupt, where the hardware interrupt vector is the number associated with the register location.

For the apparatus and method disclosed herein, a single register, which would serve both as the control register for write and as the status register for read, may be used. However, using two registers may decrease the memory contention and may be used for cache optimization. The control and status registers may be in separate cache lines.

For the apparatus and method disclosed herein, the memory interrupt may carry a signal number, where the signal number may be written by the sender node in the control register, and read by the receiver node in the status register. The signal number may be directly mapped to the hardware interrupt vector (however, the number of hardware interrupt vectors may be limited). Thus, for the apparatus and method disclosed herein, a single hardware interrupt vector may be used per register location, and demultiplexing of a signal number may be performed for each hardware interrupt vector. These aspects may provide for increasing of the scalability of the system and allow proper virtualization of the memory interrupt.

For the apparatus and method disclosed herein, the memory register interrupt may be implemented in a receiving Z-bridge, without modifications of the memory model (linear array of bytes), fabric commands, or CPU instruction set (read, write, and atomic instructions). Moreover, a variety of memory locations may supported so the implementation is more scalable and more interrupt vector numbers may be defined.

For the apparatus and method disclosed herein, every write in the Z-bridge may not need to be accounted for. For example, the registers (i.e., status and control, as disclosed herein) may nest in the memory hierarchy, the address range for a register may be at a leaf of an existing address selection tree used to route memory requests, and the memory register interrupt management device may be informed of a write request destined for the memory register interrupt management device. In this regard, the hardware interrupt vector may be hidden from the sender node, and a selected number of hardware interrupt vectors may be mapped to different memory register pairs, providing increased protection of the interrupt facility. The apparatus and method disclosed herein may support a signal number to facilitate scalability.

For the apparatus and method disclosed herein, the memory register interrupt may provide benefits related to performance, for example, by providing for messaging to selectively use polling, to minimize latency for infrequent messages, and avoiding polling overhead (e.g., with respect to interrupt mitigation). The memory register interrupt may be implemented to fit in an existing memory model of the memory fabric. Further, the receiver node may define as many memory interrupts as needed, and with the inclusion of a signal number, a relatively large number of separate signals may be supported.

According to examples, a memory register interrupt based signaling and messaging apparatus may include a control register of a receiver to receive a signal number or a bitmask including a set of signal numbers from a sender. For the signal number, a memory register interrupt management device may copy the signal number to an associated status register of the receiver, and generate, independently of the signal number from the status register, an interrupt to a CPU of the receiver. For the bitmask including the set of signal numbers, the memory register interrupt management device may combine the bitmask with a value of the associated status register, and write results of the combination in the status register and the control register, and generate, independently of content of the status register, the interrupt to the CPU.

According to examples, for the signal number, the memory register interrupt management device may generate an interrupt based on the hardware interrupt vector, inject a cache line including the status register into a cache of the CPU, and an interrupt handler may read the cache line including the status register to perform an action associated with the signal number, and for the bitmask including the set of signal numbers, the memory register interrupt management device may generate an interrupt based on the hardware interrupt vector, inject the cache line including the status register into the cache of the CPU, and the interrupt handler may read the cache line including the status register to perform the action associated with the content of the status register.

According to examples, the status register may be implemented in a memory of the receiver, and the control register may be implemented as part of an input/output memory region of the receiver, where the input/output memory region may be associated with the memory register interrupt management device, and where the input/output memory region may be different than the memory of the receiver.

According to examples, the memory register interrupt management device may combine the bitmask with the value of the associated status register by using a bitmask OR operation.

According to examples, the memory register interrupt management device may generate, independently of the content of the status register, the interrupt to the central processing unit by determining whether the content of the status register prior to an update of the status register was equal to zero, in response to a determination that the content of the status register prior to the update of the status register was equal to zero, the interrupt controller may generate the interrupt, and in response to a determination that the content of the status register prior to the update of the status register was not equal to zero, the interrupt controller may not generate the interrupt.

According to examples, the receiver may be a receiver node of a set of nodes, the sender may be a sender node of the set of nodes, each node of the set of nodes may execute an independent operating system, and each node of the set of nodes may be interconnected to other nodes of the set of nodes by a memory fabric.

Figure 2:
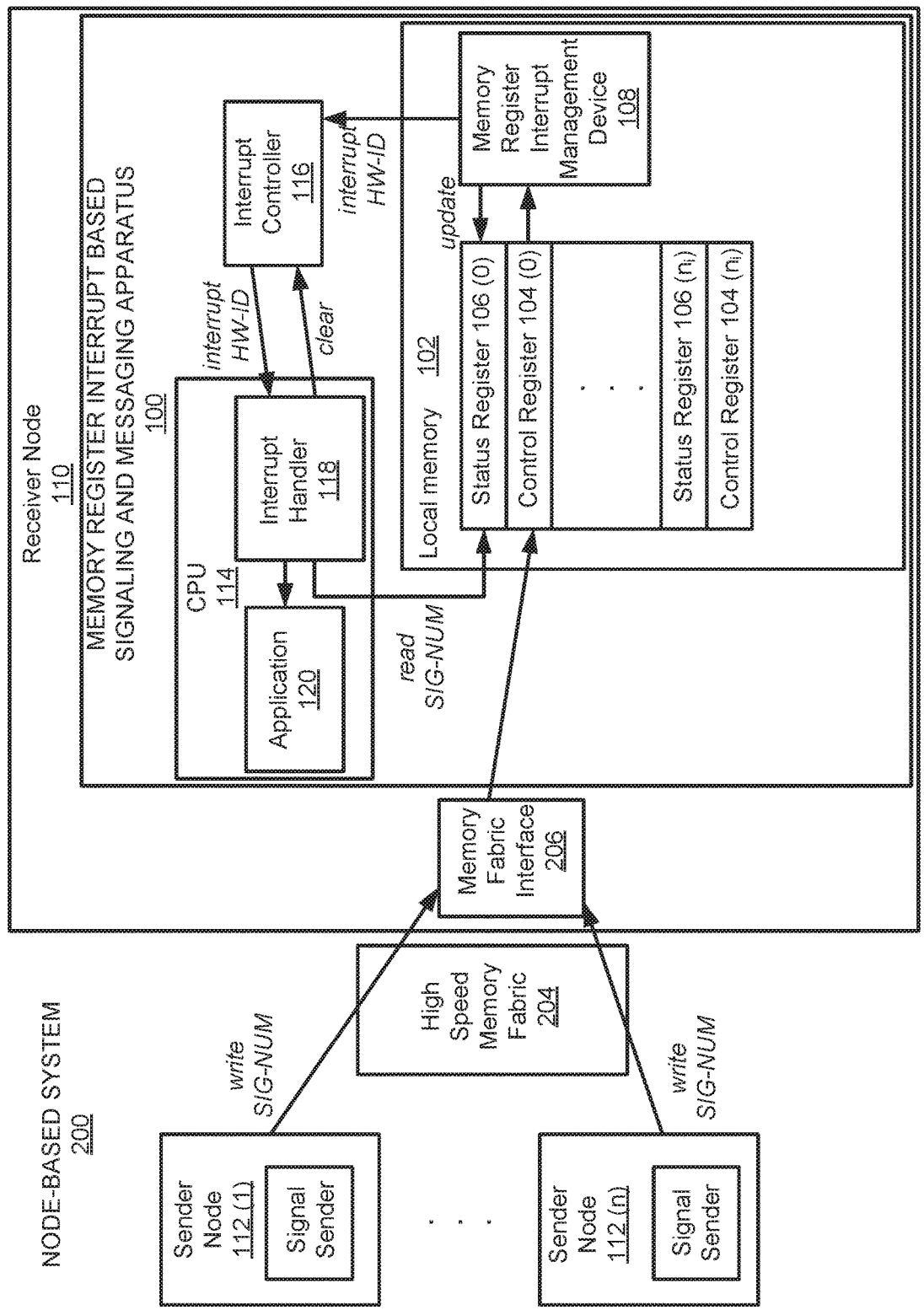
FIG. 2 illustrates an environment for the memory register interrupt based signaling and messaging apparatus of FIG. 1, according to an example of the present disclosure.

FIG. 1 illustrates a layout of a memory register interrupt based signaling and messaging apparatus (hereinafter also referred to as "apparatus 100"), according to an example of the present disclosure. FIG. 2 illustrates an environment of the apparatus 100, for example, including a node-based system 200, according to an example of the present disclosure.

Referring to FIGS. 1 and 2, the apparatus 100 may include a local memory 102 that includes a plurality of registers. The registers may be divided into register pairs that include control registers 104(0)-104($n_i$)), and status registers 106(0)-106($n_i$)). A memory register interrupt management device 108 of a receiver 110 (also designated "receiver node 110" for the example of FIG. 2) associated with the registers may perform operations such as copying of a signal number (designated as "SIG-NUM" in FIGS. 1 and 2), received at a control register (e.g., control register 104(0) as shown in FIG. 1) of the receiver 110, to an associated status register (e.g., status register 106(0) as shown in FIG. 1) of the receiver 110.

The signal number may be received from a sender 112 (also designated "sender node 112" for the example of FIG. 2).

The memory register interrupt management device 108 may generate, based on the hardware interrupt vector associated with the register location, and independently from the signal number in the status register, an interrupt to a CPU 114 of the receiver 110.

With respect to generation of the interrupt to the CPU 114, the memory register interrupt management device 108 may map a hardware interrupt vector (designated as "HW-ID" in FIGS. 1 and 2) associated with the signal number. An interrupt controller 116 of the receiver 110 may use the hardware interrupt vector to generate the interrupt to the CPU 114.

The interrupt controller 116 and/or the CPU 114 may trigger, based on the interrupt, an interrupt handler 118 of the receiver 110. The interrupt handler 118 may read the signal number from the status register to perform an action associated with the signal number. For example, the interrupt handler 118 may read the value in the status register, and then perform appropriate actions, for example, on an application 120, based on the value of the signal number.

As disclosed herein, referring to FIG. 2, the apparatus 100 may be implemented in a variety of environments, such as computer systems, or a node-based system 200 as illustrated in FIG. 2. The node-based system 200 may include a plurality of nodes that are interconnected by a high speed memory fabric 204. Examples of the high speed memory fabric 204 may include a NGMI developed for the node-based system 200, or other such memory fabrics. Each node may include a memory fabric interface 206, where the memory fabric interface may connect a node to the rest of the fabric and other nodes, and in the case of NGMI, the memory fabric interface may be denoted a Z-BRIDGE. The node-based system 200 may include a plurality of nodes that may be designated as sender nodes (e.g., nodes 112(1)-112($n$), for the example of FIG. 2), when the nodes send a signal number to a receiving node, which may be designated as a receiver node (e.g., the receiver 110).

The elements of the apparatus 100 may be machine readable instructions stored on a non-transitory computer readable medium. In this regard, the apparatus 100 may include or be a non-transitory computer readable medium. In addition, or alternatively, the elements of the apparatus 100 may be hardware or a combination of machine readable instructions and hardware. For example, the apparatus may be implemented in hardware, such as an application-specific integrated circuit (ASIC), a field-programmable gate array (FPGA), or other such formats.

According to an example, the memory register interrupt may use a pair registers that include the control register 104 and the status register 106, where the control and status registers include the value of the signal number. This type of memory register interrupt may be designated as a memory register interrupt with individual delivery.

For the memory register interrupt with individual delivery, a sender node (e.g., one of the sender nodes 112(1)-112($n$)) may write the desired signal number (e.g., SIG-NUM as illustrated in FIG. 1) in a control register (e.g., one of the control registers 104(0)-104($n_i$)) of the desired receiver node 110. When a non-zero value is written in the control register, the memory register interrupt management device 108 may copy the non-zero value to the status register (e.g., one of the associated status registers 106(0)-106 ($n_i$)), and generate an interrupt to the CPU 114 (e.g., via an interrupt controller 116). In this regard, the memory register interrupt management device 108 may be a hardware device that is specifically designed to implement the operations disclosed herein. The memory register interrupt management device 108 may send interrupts over an I/O bus to the interrupt controller 116, which then forwards the interrupt to an interrupt handler 118. In this regard, the interrupt controller 116 may be a hardware device that is specifically designed to implement the operations disclosed herein. The interrupt may trigger the interrupt handler 118. The interrupt handler 118 may read the value in the status register, and then perform appropriate actions, for example, on an application 120, based on the value of the signal number. For example, the interrupt handler 118 may wake up a specific application or task that has been waiting. For messaging, the interrupt handler 118 may read a message in a queue and push that message in another queue. Once the appropriate actions are performed, the interrupt handler 118 may write zero in the status register (i.e., the status register that was used by the interrupt handler 118 to read the value), and the memory register interrupt management device 108 may clear the associated control register.

As there may be multiple sender nodes trying to signal the same memory interrupt simultaneously, to prevent an earlier signal from being overwritten, the sender node may use a "compare and swap" atomic operation (CAS) on the control register. The CAS operation specifies that the swap should take place if the prior value of the interrupt control register is zero. If the prior interrupt was not yet read by the receiver node, the register is not zero, and the CAS operation would fail. In this case, the memory register interrupt management device 108 may also prevent overwrite of the signal number by a different signal number associated with a different sender. In case of a failed attempt, the sender node may repeat the signal operation, until the sender node eventually succeeds. If the previous interrupt was read by the receiver node, the control register is zero, and the CAS operation succeeds and sets the value of the new signal number.

The use of an atomic operation to access the memory interrupt may allow multiple sender nodes to concurrently request a remote interrupt service across the non-coherent memory fabric 204. When near-simultaneous requests are submitted, a single sender node succeeds, and may receive interrupt processing while other sender nodes wait until service returns to a not-busy state.

For the memory register interrupt with individual delivery as disclosed herein, each sender node may need to retry if an interrupt is pending, which may add complexity with respect to the sender node's processing of an interrupt, and overhead on the memory fabric 204. Further, for the memory register interrupt with individual delivery, two successive interrupts with the same signal number may be seen as two separate events.

According to an example, as disclosed herein, the memory register interrupt may use a pair of control and status registers, but the signal number may be encoded as a bit position in the memory register. This type of memory register interrupt may be designated as a memory register interrupt with coalescing.

For the memory register interrupt with coalescing as disclosed herein, a sender (e.g., one of the sender nodes 112(1)-112(n)) may write a bitmask including the set of desired signal numbers in the control register (e.g., one of the control registers 104(0)-104($n_i$)) of the desired receiver node 110. For example the signal number five may be represented by the $5^{th}$ bit, and the corresponding bitmask is 2^5=32. The memory register interrupt management device 108 may combine the written value (i.e., bitmask including the set of desired signal numbers) with the value of the status register using a bitmask "or" operation, and write the result in both the status register and the control register. For example, if signal number five and signal number one are combined, the bitmask is 2^5 or 2^1=34. The memory register interrupt management device 108 may thus simulate an atomic "or" operation, and after a write, the status register may include all the signal numbers already in the status register and all the newly written signal numbers. According to an example, if the status register already includes signal number five, the status register includes the value 2^5=32. If signal number one is written to the control register, the control register includes 2^1=2. Both the status and control registers will be updated with the combined value (32 or 2)=4. According to another example, if the status register already includes signal number five and one, the status register includes the value 2^5 or 2^1=34. If signal number five is written to the control register, the control register includes 2^5=32. Both registers will be updated with the combined value (34 or 32)=34.

After updating the status register, if the status register value prior to the update was zero, the memory register interrupt management device 108 may generate an interrupt. After updating the status register, if the status register value prior to the update was not zero, no interrupt is generated (i.e., an interrupt was previously generated and the interrupt handler 118 has not yet responded to it and read the status register). The interrupt handler 118 may read the value in the status register, clear the value in the status register, and then perform appropriate actions based on the set of signal numbers in the bitmask.

The interrupt handler 118 may read the status register and clear the status register as a single atomic operation, to avoid losing signal numbers. In this regard, the status register may clear itself every time it is read. Alternatively, the interrupt handler 118 may use an atomic "swap" operation to read the status register and set the status register to zero atomically.

With respect to memory register interrupt with coalescing, the sender node may use a write operation, without the need to retry, which may simplify the sender node machine readable instructions and reduce overhead on the memory fabric 204. If multiple sender nodes are trying to write simultaneously different signal numbers, the signal numbers may be added together in the bitmask. If multiple sender nodes are trying to write simultaneously the same signal number, the signal number may be coalesced and a single interrupt is generated.

If the receiver node does not read the status register due to interrupt mitigation, no new interrupt is generated and signal numbers may be accumulated, waiting to be read. With respect to interrupt mitigation, by default, the memory register interrupt management device 108 may be in interrupt mode, waiting for an interrupt. When an interrupt arrives, the interrupt handler 118 may disable the interrupt and proceed to a poll mode. In poll the mode, the memory register interrupt management device 108 may check at a frequent regular interval if a status register needs to be serviced. Packet reception may be batched to minimize context switch and cache penalty. If packets are no longer received, the interrupt handler 118 may re-enable interrupts and revert to the interrupt mode, thus eliminating the overhead of the frequent polling of the status register.

With respect to memory register interrupt with coalescing, if additional signal numbers are needed, a number of register pairs and hardware interrupt vectors may be used as needed to increase the number of signal numbers. Each pair of registers may support a number of signal numbers equal to the number of bits in the register, denoted nb. If the number of register pairs is npr, the total number of signal numbers is nb*npr. This may be limited by the number of available hardware interrupt vectors, where each register pair may consume one hardware interrupt vector. Alternatively, some signal numbers may be shared by different functions. For example, when two applications share the same signal number, when that signal number is asserted, the interrupt handler calls both applications. Alternatively, a single hardware interrupt vector may be shared by multiple register pairs, which increases the need more register pairs and interrupt demultiplexing (i.e., multiple reads instead of a single read). In this regard, as disclosed herein, where the total number of signal numbers is nb*npr, all register pairs may use the same hardware interrupt vector, but the interrupt handler reads all registers when the interrupt handler is triggered, as the interrupt handler does not know which register was written.

With respect to reading of the status register, the interrupt handler 118 may read the status register to decode the signal number.

In order to increase the efficiency of reading of the status register to decode the signal number, as a first option, reading of the status register may be omitted. To clear the interrupt, the interrupt handler may write a zero, the write operation may be pipelined, and the interrupt handler does not wait for its completion. This option renders the signal number as being unavailable, and therefore, this option may be used if a single signal number is defined for that memory interrupt.

In order to increase the efficiency of reading of the status register to decode the signal number, as a second option, the memory register interrupt management device 108 may be incorporated into a cache coherency protocol. In this regard, the status register may be configured as cacheable. The memory register interrupt management device 108 may use the cache coherency protocol to confirm that the CPUs do not have a stale value. When an interrupt is generated, the memory register interrupt management device 108 may inject the cache line containing the status register into the caches of the CPUs, in a proactive manner. When the interrupt handler 118 reads the status register, the read request may be returned from the cache with the proper updated value. In this regard, alternatively, the memory register interrupt management device may invalidate the cache line including the status register when the memory register interrupt management device generates an interrupt. This would force reading of the cache line via the cache coherency protocol from the status register 106 as needed.

In order to increase the efficiency of reading of the status register to decode the signal number, as a third option, memory may be used for the status register instead of a register in I/O memory mapped to the management device. The control registers may still be part of the I/O memory region associated with the memory register interrupt management device 108, and are still configured as not cacheable. For each control register, a status register may be allocated in the standard memory of the local node, where the status register may be reserved and configured by machine readable instructions, and the status register is cacheable. Every time the control register is written, the memory register interrupt management device 108 may need to update the status register in memory. The memory register interrupt management device 108 may be part of the cache coherency protocol, and performs a write operation as if the memory register interrupt management device 108 was another CPU. If the status register is cached by a CPU, the value in the cache may be updated and the cache may be marked as write-back. If no CPU has cached the status register, the actual memory location may need to be updated, however as this may not likely occur, the cache may be updated and the write is not sent to main memory. When the interrupt handler 118 reads the status register, the read request may be returned from one of the CPU cache with the proper updated value. Similarly, every time the status register is to be cleared, the memory register interrupt management device 108 may realize the write operation through the cache coherency protocol, and clear the control register.

Figure 3:
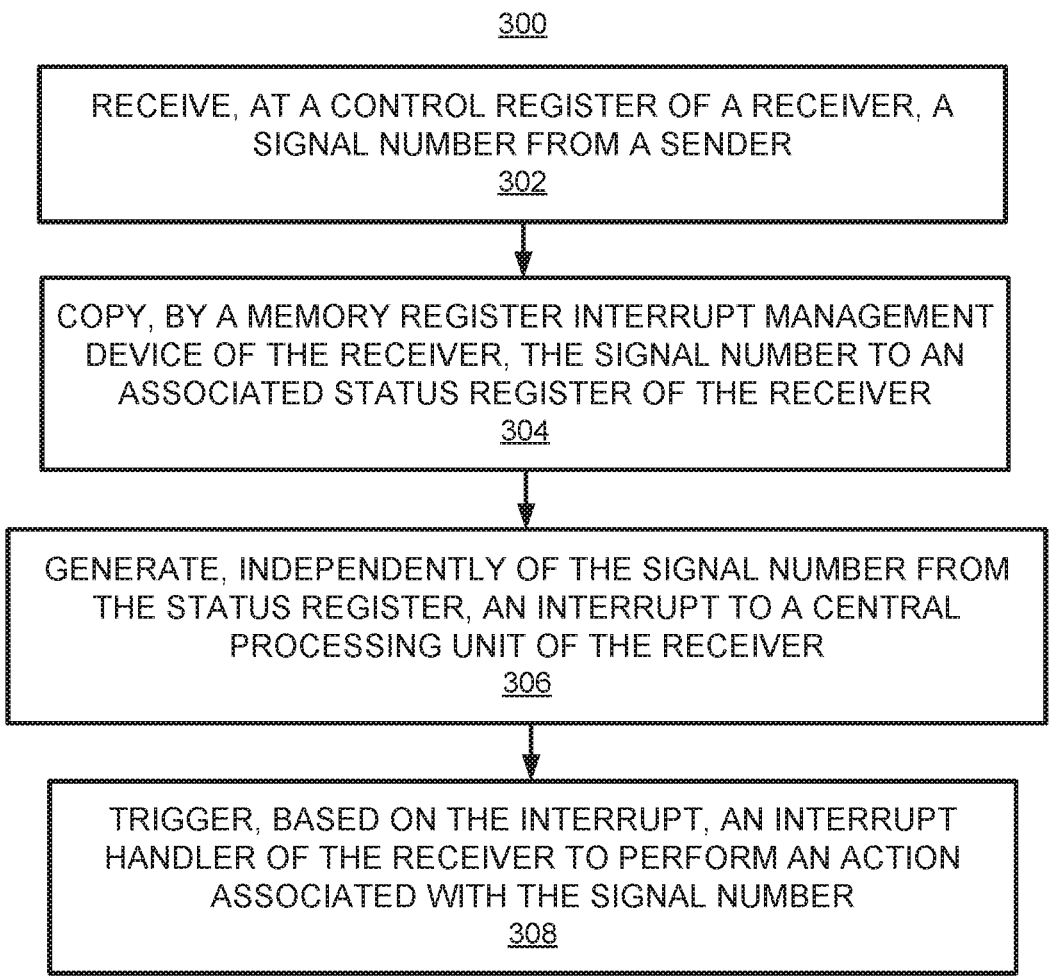
FIG. 3 illustrates a flowchart of a method for memory register interrupt based signaling and messaging, according to an example of the present disclosure.

FIG. 3 illustrates a flowchart of a method 300 for implementation of memory register interrupt based signaling and messaging, corresponding to the example of the memory register interrupt based signaling and messaging apparatus 100 whose construction is described in detail above. The method 300 may be implemented on the memory register interrupt based signaling and messaging apparatus 100 with reference to FIGS. 1 and 2 by way of example and not limitation. The method 300 may be practiced in other apparatus.

Referring to FIGS. 1-3, for the method 300, at block 302, the method may include receiving, at a control register (e.g., control register 104(0)) of a receiver (e.g., the receiver node 110), a signal number from a sender (e.g., one of the sender nodes 112(1)-112(n)).

At block 304, the method may include copying, by a memory register interrupt management device 108 of the receiver, the signal number to an associated status register (e.g., status register 106(0)) of the receiver.

At block 306, the method may include generating, independently of the signal number from the status register (e.g., status register 106(0)), an interrupt to a CPU (e.g., the CPU 114) of the receiver.

At block 308, the method may include triggering, based on the interrupt, an interrupt handler 118 of the receiver to perform an action associated with the signal number (e.g., an action associated with the application 120 as disclosed herein).

According to examples, for the method 300, the receiver may be a receiver node of a set of nodes, the sender may be a sender node of the set of nodes, each node of the set of nodes may execute an independent operating system, and each node of the set of nodes may be interconnected to other nodes of the set of nodes by a memory fabric (e.g., the high speed memory fabric 204).

According to examples, for the method 300, the memory fabric may be a non-coherent memory fabric.

According to examples, the method 300 may further include determining whether the signal number includes a non-zero value, and in response to a determination that the signal number includes the non-zero value, preventing overwrite of the signal number by a different signal number associated with a different sender (e.g., a different sender node of the sender nodes 112(1)-112(n)).

According to examples, for the method 300, generating, independently from the signal number from the status register, the interrupt to the central processing unit of the receiver, may further include mapping, by the memory register interrupt management device 108, a hardware interrupt vector (e.g., HW-ID) to the signal number, and using, by an interrupt controller 116 of the receiver, the hardware interrupt vector to generate the interrupt to the central processing unit 114 of the receiver.

According to examples, for the method 300, further to performance of the action associated with the signal number, the method may include writing, by the interrupt handler 118, a zero value in the status register, and clearing, by the memory register interrupt management device 108, the associated control register.

According to examples, for the method 300, for a plurality of pairs of registers that include control registers and associated status registers respectively including the control register and the status register, the method may include mapping each of the plurality of pairs of registers to a different interrupt.

According to examples, for the method 300, the signal number may correspond to a signal associated with a message from the sender to the receiver when the message is added to a queue of the receiver.

Figure 4:
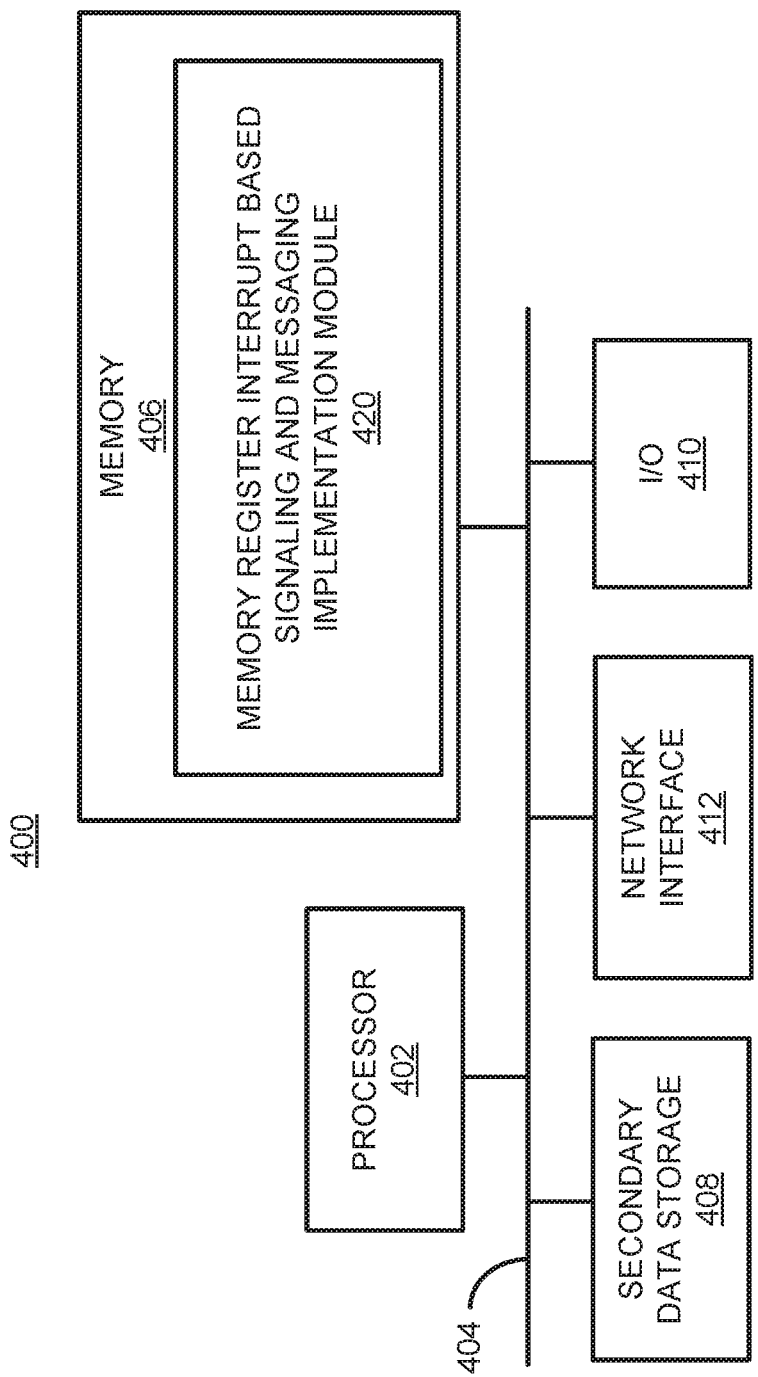
FIG. 4 illustrates a computer system, according to an example of the present disclosure.

FIG. 4 shows a computer system 400 that may be used with the examples described herein. The computer system 400 may represent a generic platform that includes components that may be in a server or another computer system. The computer system 400 may be used as a platform for the apparatus 100. The computer system 400 may execute, by a processor (e.g., a single or multiple processors) or other hardware processing circuit, the methods, functions and other processes described herein. These methods, functions and other processes may be embodied as machine readable instructions stored on a computer readable medium, which may be non-transitory, such as hardware storage devices (e.g., RAM, ROM, EPROM, EEPROM, hard drives, and flash memory).

The computer system 400 may include a processor 402 that may implement or execute machine readable instructions performing some or all of the methods, functions and other processes described herein. Commands and data from the processor 402 may be communicated over a communication bus 404. The computer system may also include a main memory 406, such as a RAM, where the machine readable instructions and data for the processor 402 may reside during runtime, and a secondary data storage 408, which may be non-volatile and stores machine readable instructions and data. The memory and data storage are examples of computer readable mediums. The memory 406 may include a memory register interrupt based signaling and messaging implementation module 420 including machine readable instructions residing in the memory 406 during runtime and executed by the processor 402. The memory register interrupt based signaling and messaging implementation module 420 may include the elements of the apparatus 100 shown in FIGS. 1 and 2.

The computer system 400 may include an I/O device 410, such as a keyboard, a mouse, a display, etc. The computer system may include a network interface 412 for connecting to a network. Other known electronic components may be added or substituted in the computer system.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A method for implementing memory register interrupt based signaling and messaging, the method comprising:
   receiving, at a control register of a receiver, a bitmask including a set of signal numbers from a sender;
   combining the bitmask with a value of an associated status register of the receiver;
   write results of the combination in the associated status register and the control register;
   generating, independently of content of the associated status register, an interrupt to a central processing unit of the receiver; and
   triggering, based on the interrupt, an interrupt handler of the receiver to perform an action associated with the content of the associated status register.

2. The method according to claim 1, wherein
   the receiver is a receiver node of a set of nodes,
   the sender is a sender node of the set of nodes,
   each node of the set of nodes executes an independent operating system, and
   each node of the set of nodes is interconnected to other nodes of the set of nodes by a memory fabric.

3. The method according to claim 1, wherein the memory fabric is a non-coherent memory fabric.

4. The method according to claim 1, further comprising:
   further to performance of the action associated with the content of the associated status register, writing, by the interrupt handler, a zero value in the status register; and
   clearing, by the memory register interrupt management device, the associated control register.

5. The method according to claim 1, further comprising:
   for a plurality of pairs of registers that include control registers and associated status registers respectively including the control register and the status register, mapping each of the plurality of pairs of registers to a different interrupt.

6. The method according to claim 1, wherein the bitmask corresponds to a signal associated with a message from the sender to the receiver when the message is added to a queue of the receiver.

7. A memory register interrupt based signaling and messaging apparatus comprising:
   a control register to receive a bitmask including a set of signal numbers; and
   a memory register interrupt management device to
      combine the bitmask with a value of an associated status register,
      write results of the combination in the status register and the control register, and
      generate, independently of content of the status register, an interrupt to a central processing unit.

8. The memory register interrupt based signaling and messaging apparatus according to claim 7, wherein the memory register interrupt management device is to combine the bitmask with the value of the associated status register by using a bitmask OR operation.

9. The memory register interrupt based signaling and messaging apparatus according to claim 7, wherein the memory register interrupt management device is to generate, independently of the content of the status register, the interrupt to the central processing unit by
   determining whether the content of the status register prior to an update of the status register was equal to zero,
   in response to a determination that the content of the status register prior to the update of the status register was equal to zero, generating the interrupt, and
   in response to a determination that the content of the status register prior to the update of the status register was not equal to zero, not generating the interrupt.

10. The memory register interrupt based signaling and messaging apparatus according to claim 7, wherein for a plurality of pairs of registers that include control registers and associated status registers respectively including the control register and the status register, each of the plurality of pairs of registers is mapped to a different interrupt.

11. The memory register interrupt based signaling and messaging apparatus according to claim 7, wherein the bitmask corresponds to a signal associated with a message from a sender to a receiver when the message is added to a queue of the receiver.

12. A memory register interrupt based signaling and messaging apparatus comprising:
   a control register of a receiver to receive a signal number or a bitmask including a set of signal numbers from a sender; and
   for the signal number,
      a memory register interrupt management device to
         copy the signal number to an associated status register of the receiver, and
         generate, independently of the signal number from the status register, an interrupt to a central processing unit (CPU) of the receiver, and for the bitmask including the set of signal numbers,
the memory register interrupt management device is to
combine the bitmask with a value of the associated status register, and write results of the combination in the status register and the control register, and
generate, independently of content of the status register, the interrupt to the CPU.

13. The memory register interrupt based signaling and messaging apparatus according to claim 12, wherein
for the signal number,
the memory register interrupt management device is to
generate the interrupt based on a hardware interrupt vector, and
inject a cache line including the status register into a cache of the CPU, and
an interrupt handler is to read the cache line including the status register to perform an action associated with the signal number, and
for the bitmask including the set of signal numbers,
the memory register interrupt management device is to
generate the interrupt based on the hardware interrupt vector, and
inject the cache line including the status register into the cache of the CPU, and
the interrupt handler is to read the cache line including the status register to perform the action associated with the content of the status register.

14. The memory register interrupt based signaling and messaging apparatus according to claim 12, wherein
the status register is implemented in a memory of the receiver, and
the control register is implemented as part of an input/output memory region of the receiver, wherein the input/output memory region is associated with the memory register interrupt management device, and wherein the input/output memory region is different than the memory of the receiver.

15. The memory register interrupt based signaling and messaging apparatus according to claim 12, wherein
the receiver is a receiver node of a set of nodes,
the sender is a sender node of the set of nodes,
each node of the set of nodes executes an independent operating system, and
each node of the set of nodes is interconnected to other nodes of the set of nodes by a memory fabric.

\* \* \* \* \*